(12) United States Patent
Walter et al.

(10) Patent No.: US 11,614,214 B2
(45) Date of Patent: Mar. 28, 2023

(54) METHOD FOR OPERATING A MOTOR VEHICLE WITH A HEADLIGHT FOR THE FAST AND SAFE SETTING OF A LEAVING-HOME POSITION, HEADLIGHT, AND MOTOR VEHICLE

(71) Applicant: Dr. Ing. h.c. F. Porsche Aktiengesellschaft, Stuttgart (DE)

(72) Inventors: Dominik Walter, Leinfelden-Echterdingen (DE); Benjamin Hummel, Tamm (DE); Marinko Tuka, Sachsenheim (DE); Steffen Swoboda, Stuttgart (DE); Maximilian Bossler, Leonberg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/524,843

(22) Filed: Nov. 12, 2021

(65) Prior Publication Data
US 2022/0146070 A1    May 12, 2022

(30) Foreign Application Priority Data
Nov. 12, 2020   (DE) ................ 10 2020 129 824.2

(51) Int. Cl.
*F21S 41/657*  (2018.01)
*B60Q 1/076*  (2006.01)
*B60Q 1/08*  (2006.01)

(52) U.S. Cl.
CPC ............ *F21S 41/657* (2018.01); *B60Q 1/076* (2013.01); *B60Q 1/08* (2013.01)

(58) Field of Classification Search
CPC .......... F21S 41/657; B60Q 1/08; B60Q 1/076
See application file for complete search history.

(56) References Cited

U.S. PATENT DOCUMENTS

| 9,150,143 | B2 | 10/2015 | Choi |
| 9,421,902 | B2* | 8/2016 | Kowatzki ............... B60Q 1/30 |
| 9,961,745 | B2* | 5/2018 | Salter ..................... B60Q 3/20 |
| 10,604,064 | B2* | 3/2020 | Kuhl ..................... B60Q 1/247 |

(Continued)

FOREIGN PATENT DOCUMENTS

EP    3489085    5/2019

OTHER PUBLICATIONS

German Search Report dated Jul. 21, 2021.

*Primary Examiner* — Arman B Fallahkhair
(74) *Attorney, Agent, or Firm* — Gerald E. Hespos; Michael J. Porco

(57) ABSTRACT

A method is provided for operating a motor vehicle (100) having a headlight (1) with a projection module (2). The projection module (2) is moved into a projection position by a motor (3) to regulate a beam width of the headlight (1). The motor (3) is controlled to move the projection module (2) into the projection position and to reach a motor setpoint value. The motor setpoint value is stored in a non-volatile memory (4) of the headlight (1) and, when a voltage supply to the headlight (1) is activated following deactivation of the voltage supply, the projection module (2) is moved, starting from the stored motor setpoint value, into a leaving-home position so as to illuminate an environment adjacent to the motor vehicle (100). A headlight (1) and a motor vehicle (100) also are provided.

10 Claims, 2 Drawing Sheets

(56) References Cited

U.S. PATENT DOCUMENTS

| | | | |
|---|---|---|---|
| 10,723,258 B2* | 7/2020 | Salter | F21S 41/141 |
| 2017/0129394 A1* | 5/2017 | Salter | F21V 23/003 |
| 2018/0065537 A1* | 3/2018 | Abrams | B60Q 1/323 |
| 2021/0170939 A1* | 6/2021 | Whitton | B60Q 1/0035 |

* cited by examiner

METHOD FOR OPERATING A MOTOR VEHICLE WITH A HEADLIGHT FOR THE FAST AND SAFE SETTING OF A LEAVING-HOME POSITION, HEADLIGHT, AND MOTOR VEHICLE

CROSS REFERENCE TO RELATED APPLICATION

This application claims priority under 35 USC 119 to German Patent Appl. No. 10 2020 129 824.2 filed on Nov. 12, 2020, the entire disclosure of which is incorporated herein by reference.

BACKGROUND

Field of the Invention

The invention relates to a method for operating a motor vehicle with a headlight for the fast and safe setting of a leaving-home position. The invention also relates to a headlight and to a motor vehicle.

Related Art

Modern headlights make it possible to set a wide variety of light scenarios. In addition to optimum illumination of the road when driving, coming-home and leaving-home light scenarios are very popular and considerably increase comfort and safety when using the motor vehicle.

Coming-home light scenario is the name given to a light scenario that illuminates the region directly around the motor vehicle immediately following parking of the motor vehicle, and thus makes exiting the vehicle safer and makes the path from the motor vehicle for example to the front door safer. In the leaving-home light scenario, the region directly around the motor vehicle is likewise illuminated, but before the start of the journey. This may be triggered for example by unlocking the locking system of the motor vehicle or through proximity sensors.

Headlights having special projection modules are often installed in high-value motor vehicles. These projection modules allow accurate projection of light of precisely predefined intensities and/or colors, typically in HD resolution. By way of example, driving situation-dependent orientation lines may thus be projected directly onto the road, individual regions may be masked so as to avoid dazzling oncoming traffic, or known hazards may be lit up to a significant extent.

When setting leaving-home or coming-home light scenarios, light has to be projected onto the ground at an atypically short distance from the headlight. The projection module is usually pivoted for this purpose. In this case, a motor that is present during driving mode of the motor vehicle is used to bring the projection module into an optimum projection position such that the beam width of the headlight corresponds to a setpoint beam width and is not too wide or too short.

The voltage supply to the headlight normally is turned off when the motor vehicle is parked at the end of the journey. In the process, the headlight also loses the information about the projection position in which the projection module is arranged. To arrive at this information, a reference run of the motor is performed. In this case, the motor moves the projection module until it has reached all of the end stops. Thus, the motor position is known, and the projection module is able to be set to a projection position in a highly precise manner.

Accuracy is less important when activating the leaving-home light scenario and the vehicle driver would rather enough light be projected onto the ground around the motor vehicle very quickly. However, performing a reference run extends the amount of time until the leaving-home light scenario is set. Moving to an appropriate leaving-home position is dangerous without any information about the current projection position because it is not possible to rule out mechanical damage caused by unintentionally running into the end stops.

An object of the invention is to provide a method for operating a motor vehicle with a headlight comprising a projection module. The method does not exhibit the outlined disadvantages from the prior art but rather makes it possible to move the projection module safely and quickly into the leaving-home position.

SUMMARY

The invention relates to a method for operating a motor vehicle having a headlight with a projection module. The projection module is moved into a projection position by a motor to regulate a beam width of the headlight. The motor is controlled to move the projection module into the projection position, and the motor has a motor setpoint value corresponding to the motor projection position. The method includes storing the motor setpoint value in a non-volatile memory of the headlight. When a voltage supply to the headlight is activated following deactivation of the voltage supply, the projection module is moved from the stored motor setpoint value, into a leaving-home position so as to illuminate an environment adjacent to the motor vehicle.

The method of the invention allows very fast moving of the projection module into the leaving-home position with a very low risk of mechanical damage caused by the motor running into an end stop. It is not necessary to wait for a reference run of the motor, and therefore the projection module is able to be moved directly into the leaving-home position.

The projection module may be moved into the leaving-home position only when a brightness sensor of the motor vehicle detects an external brightness that is below a predetermined threshold value. The motor setpoint value may be calculated by a controller. Additionally, the motor setpoint value may be linked to a rotational position of the motor. In some embodiments, when the headlight is activated, upon each change of the motor setpoint value, the changed motor setpoint value is written to the memory. In other embodiments, the motor setpoint value is stored in the memory only before the voltage supply is deactivated and following the last change of the motor setpoint value prior to the deactivation. In still other embodiments, an old motor setpoint value in the memory is overwritten when the motor setpoint value is stored. Other embodiments are configured so that only the current motor setpoint value is stored in the memory.

According to one embodiment, no reference run of the motor is performed before moving into the leaving-home position. This ensures rapid setting of the leaving-home light scenario and prevents irritation caused by light from the headlights swivelling up and down.

According to a further embodiment, the motor is a stepper motor. Stepper motors may be operated without encoders. Thus, just the information about the current motor setpoint value is sufficient to move the projection module safely and quickly to the leaving-home position.

A further embodiment is configured so that the motor setpoint value is written to the memory as a motor position of the motor. Thus, the motor setpoint value and the projection position can be linked directly with the data for driving the motor. In this embodiment, there is no need to translate an angular position of the projection module into a rotational position of the motor.

A reference run of the motor may be performed when activating an ignition of the motor vehicle or when activating a machine for generating traction of the motor vehicle. The reference run makes it possible to check for discrepancies or inaccuracies, and thus allows highly exact setting of the projection position in a driving mode. Activating the ignition of the motor vehicle or activating the machine for generating traction are operations performed in preparation for a driving mode. The method is not restricted to a combustion vehicle, but may also be used in connection with an electric vehicle. Activating the machine within the meaning of the invention could include applying voltages to a stator winding of the machine.

A travel distance for moving into the leaving-home position may be calculated by a controller of the headlight from the stored motor setpoint value and a setpoint position. The motor may be driven by the controller so as to move the projection module by the travel distance. The setpoint position may be a permanently stored value. It is thereby possible to set the leaving-home position quickly with barely any computing expenditure.

In some embodiments, no further measured values, other than the stored motor setpoint value and the setpoint position, are used to move into the leaving-home position. The lack of querying further sensors speeds up the setting of the leaving-home position and thus explicitly selects a slightly less accurate setting of the leaving-home position. This is entirely desirable at this point, since relatively small inaccuracies when setting the leaving-home position are not as consequential as a delay caused by querying sensor values.

A reference run of a further motor of the headlight may be performed during the moving of the projection module into the leaving-home position so as to move a further projection module of the headlight. Thus, the headlight can be prepared for the driving mode even during the projection of the leaving-home light scenario. Preferably, no light is projected from the further projection module when performing the reference run of the further motor.

The invention also relates to a headlight for a motor vehicle. The headlight is configured to perform the method of the invention.

The headlight according to the invention allows very fast moving of the projection module into the leaving-home position with a very low risk of mechanical damage caused by the motor running into an end stop. The waiting time until the illumination of the vehicle environment is provided is minimized, thereby offering a considerable gain in terms of safety when entering the motor vehicle.

The invention also relates is a motor vehicle having the above-described headlight.

All of the details, features and advantages disclosed above in connection with the method of the invention also apply to the headlight according to the invention and to the motor vehicle according to the invention.

Further details, features and advantages of the invention will emerge from the drawing and from the following description of preferred embodiments on the basis of the drawing. Here, the drawing illustrates merely exemplary embodiments of the invention, which do not restrict the concept of the invention.

BRIEF DESCRIPTION OF THE DRAWINGS

FIGS. 1A, 1B and 1C schematically illustrate a motor vehicle with a headlight according to exemplary embodiments of the present invention, wherein: FIG. 1A shows the projection module in a projection position for a driving mode, FIG. 1B shows the projection module that has been moved to a leaving home position and FIG. 1C shows a headlight having two projection modules, each of which has a motor.

DETAILED DESCRIPTION

Figure 1A:
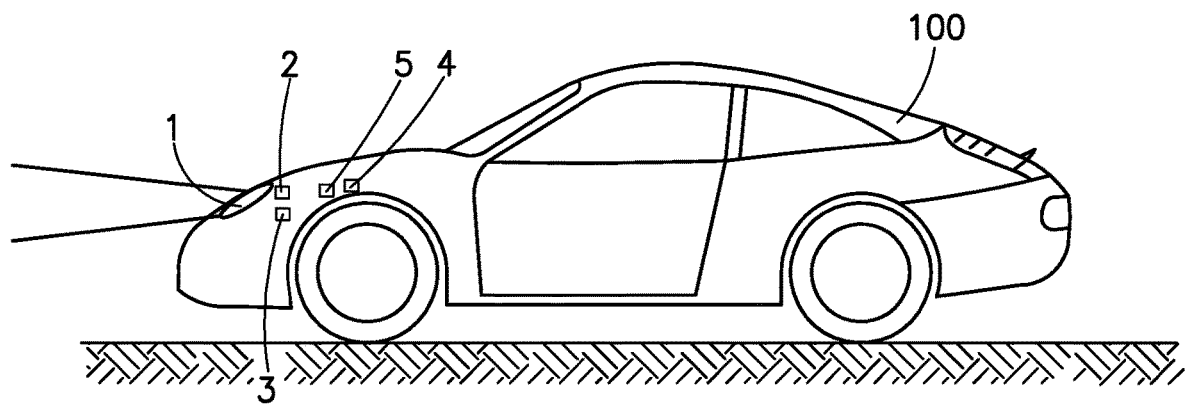
Figure 1B:
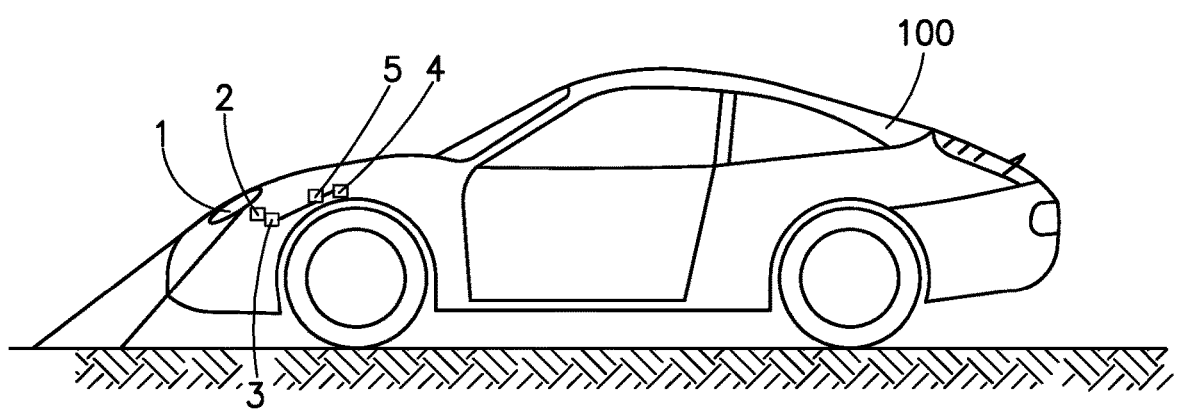

FIGS. 1A and 1B schematically illustrate a motor vehicle 100 according to an embodiment of the invention with a headlight 1 according to an embodiment of the invention. The elements shown in FIGS. 1A and 1B may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The headlight 1 has a projection module 2, as shown in FIGS. 1A and 1B. A motor 3, such as a stepper motor, is used to move the projection module 2 into a projection position and thereby setting a beam width of the headlight 1. A controller 5 controls the motor 3 for this purpose.

The motor 3 can move the projection module 2 into a projection position for a driving mode so that regions that are ahead of the motor vehicle 100 and that may be a relatively great distance from the vehicle can be illuminated, as shown in FIG. 1A. However, it makes sense to illuminate the region directly ahead of the motor vehicle 100 when entering and exiting, as shown in FIG. 1B.

The voltage supply to the headlight 1 typically is turned off when the motor vehicle 100 is parked and deactivated. Normal headlights from the prior art lose information about the last set projection position of the projection module when the vehicle is turned off, and also lose information about the last set motor values, such the rotational position of the motor 3.

If the motor vehicle 100 is parked and is unlocked, then the motor 3 moves the projection module 2 into a leaving-home position in which the region directly ahead of the motor vehicle 100 can be illuminated by the projection module 2, as shown in FIG. 1B. However, without information about the last set projection position of the projection module 2, it is possible to set the leaving-home position only inaccurately. There is also the risk of the motor 3 unwantedly running into an end stop.

Nevertheless, to save time, a reference run of the motor 3 is dispensed with. This is made possible by a non-volatile memory 4 in which the last motor setpoint value was stored, for example in the form of a motor position, before the voltage supply to the headlight 1 was deactivated. The motor setpoint value is a value, preferably calculated or looked up in a lookup table, that the motor 3 reaches when moving the projection module 2. Based on the stored motor setpoint value, the controller 5 calculates a travel distance by which the motor 3 has to move the projection module 2 to arrive at a position in which the projection module 2 is arranged in the leaving-home position.

Figure 1C:
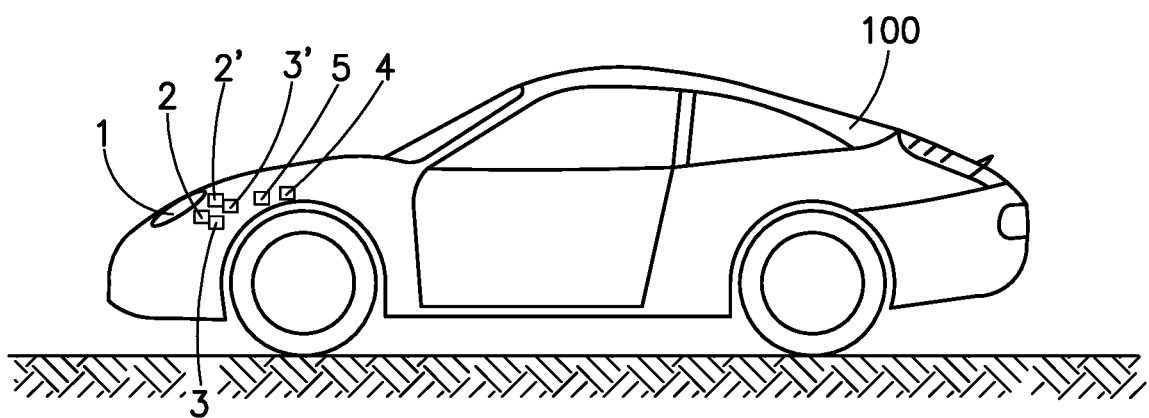

A reference run of a further motor 3' is performed already while the projection module 2 is being moved into the leaving-home position of FIG. 1C. The further motor 3' moves a further projection module 2' of the headlight 1. The further projection module 2' may thereby be oriented in a precise manner for use in driving mode without any further delay at the end of or even during the projection of the leaving-home light scenario.

A reference run of the motor 3 is performed if the vehicle driver has entered the motor vehicle 100 and is preparing the motor vehicle 100 for a driving mode, for example by starting an ignition of the motor vehicle 100. The reference run ensures precise setting of the projection module 2 in driving mode.

In the context of this disclosure, the controller 5 can be understood to include, for example, a processor and/or a storage unit or memory for storing algorithms and program commands. By way of example, the processor and/or the control unit is specifically configured to carry out program commands in such a way that the processor and/or the control unit carries out functions to implement or realize a method as disclosed herein or a step of a method as disclosed herein. The term controller is used here synonymously with devices known from the prior art. A control unit, therefore, encompasses a "computer" and accordingly comprises one or more general-purpose processors (CPUs) or microprocessors, RISC processors, GPUs and/or DSPs. The control unit or computer has for example additional elements such as storage interfaces of communication interfaces. Optionally or additionally, the term "controller" refers to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

In the context of this disclosure, the memory 4 can be understood to mean, for example, a volatile memory in the form of random access memory (RAM) or a non-volatile permanent memory, such as a hard disk drive or a data medium or, for example, a replaceable storage module or a cloud-based storage solution. The memory 4 or storage unit can be accessed by the control unit 5, which then compares the last stored motor setpoint value to the permanently stored setpoint position.

LIST OF REFERENCE SIGNS

1 Headlight
2 Projection module
2' Further projection module
3 Motor
3' Further motor
4 Memory
5 Controller
100 Motor vehicle

What is claimed is:

1. A method for operating a motor vehicle having a headlight with a projection module, a motor for moving the projection module, and a non-volatile memory, the method comprising:
  operating the motor to move the projection module into a projection position to regulate a beam width of the headlight;
  identifying a motor setpoint value of the motor when the projection module has reached the projection position;
  storing the motor setpoint value of the motor in the non-volatile memory of the headlight; and
  moving the projection module from the stored motor setpoint value into a leaving-home position so as to illuminate an environment adjacent to the motor vehicle when a voltage supply to the headlight is activated following deactivation of the voltage supply.

2. The method of claim 1, wherein the non-volatile memory has a permanently stored setpoint position of the motor corresponding to the leaving-home position, and wherein the method further comprises using a controller of the headlight to calculate a travel needed for moving the projection module from the stored motor setpoint value into a setpoint position corresponding to the leaving-home position; and then using the controller for driving the motor to move the projection module from a position corresponding the stored motor setpoint value to the leaving-home position when the voltage supply to the headlight is activated following deactivation of the voltage supply.

3. The method of claim 2, wherein no further measured values, other than the stored motor setpoint value and the setpoint position, are used to move into the leaving-home position.

4. A headlight for a motor vehicle, wherein the headlight is configured to perform the method of claim 1.

5. A motor vehicle having the headlight of claim 4.

6. The method of claim 1, wherein the projection module is moved into the leaving-home position without performing a reference run of the motor.

7. The method of claim 1, wherein the motor is a stepper motor.

8. The method of claim 1, wherein storing the motor setpoint value of the motor in the non-volatile memory comprises having the motor setpoint value written to the memory as a motor position of the motor.

9. The method of claim 1, further comprising performing a reference run of the motor when activating an ignition of the motor vehicle or when activating a machine for generating traction of the motor vehicle.

10. The method of claim 1, wherein, during the moving of the projection module into the leaving-home position, a reference run of a further motor of the headlight is performed so as to move a further projection module of the headlight.

* * * * *